United States Patent [19]
Meges

[11] 3,765,450
[45] Oct. 16, 1973

[54] COMBINED SHUT-OFF AND DRAIN VALVE

[75] Inventor: Helmut Meges, Neheim-Husten, Germany

[73] Assignee: Metallwerke Neheim Goeke & Co. KG, Neheim-Husten, Germany

[22] Filed: Mar. 27, 1972

[21] Appl. No.: 238,150

[30] Foreign Application Priority Data
Mar. 27, 1971 Germany............... P 21 15 024.3

[52] U.S. Cl............ 137/596.2, 137/637.2, 251/354
[51] Int. Cl............................................. F16k 11/10
[58] Field of Search................. 137/596.2, 614.18, 137/614.19, 637.2, 637.3, 322, 269; 251/353, 354

[56] References Cited
UNITED STATES PATENTS
1,226,436  5/1917  Albrecht.................. 137/614.18
2,646,244  7/1953  Sohn........................ 251/354 X Primary Examiner—Henry T. Klinksiek
Attorney—Michael S. Striker

[57] ABSTRACT

A combined shut-off and drain valve in which a valve housing is provided between the inlet and the outlet end thereof with a valve seat and a socket axially aligned with the valve seat. A tubular valve member is axially aligned with the valve seat. A tubular valve member is axially movable in the socket between an open position and a closed position in which one end of the tubular member engages the valve seat to prevent flow of fluid between the inlet and the outlet. The tubular valve member is formed between the ends thereof with a second valve seat and a second valve member located between the one end of the tubular valve member and the second valve seat is normally spring biased in engagement with the latter. Preferably a tubular member is insertable through the other end of the tubular valve member for moving the second valve member away from the second valve seat so that fluid passing from the inlet into the interior of the valve housing may be drained therefrom regardless whether the tubular valve member is in the open or the closed position.

10 Claims, 2 Drawing Figures

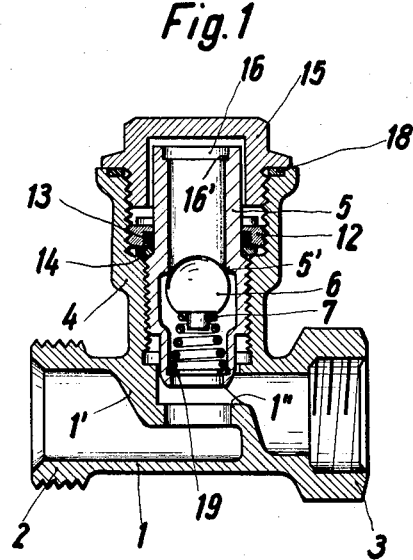
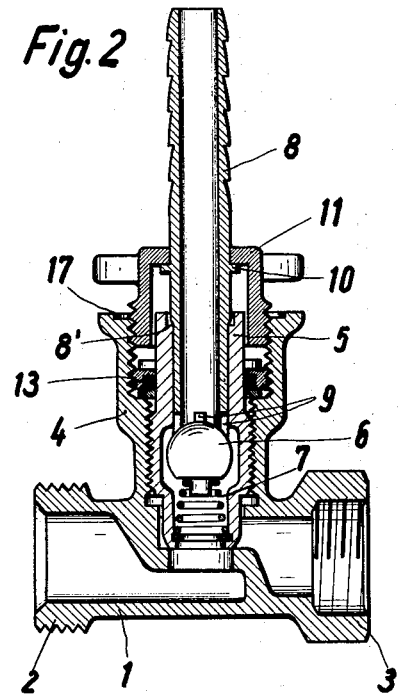

COMBINED SHUT-OFF AND DRAIN VALVE

BACKGROUND OF THE INVENTION

Hot water heating installations are commonly constructed in such a manner that some or all heaters or radiators thereof may be individually shut-off from the remainder of the installation. This has the advantage that such radiators may be detached from the installation whenever repair of such radiators becomes necessary without disrupting service of the remainder of the installation.

In such installations it is necessary to provide, besides the regulating and shut-off valve at the inlet of the radiator, a second shut-off valve between rediator and the return conduit thereof, as well as a ventilating valve on a radiator nipple opposite the mentioned regulating and shut-off valve and at the lower nipple of the radiator a drain cock or similar drain valve. Therefore, a total of four valves are necessary in this case which evidently detrimentally increase the cost of the heating installation.

SUMMARY OF THE INVENTION

It is an object of the present invention to overcome the above-mentioned disadvantage in such hot water heating installations and to provide for an arrangement in which the number of necessary separate valves may be reduced so as to reduce the cost of such installations.

It is a further object of the present invention to provide a combined shut-off and drain valve to be installed between the radiator and the return conduit thereof which not only permits to separate the radiator from the return conduit but which also permits draining of the radiator so that the provision of a separate draining cock becomes unnecessary.

With these objects in view, the combined shut-off and drain valve according to the present invention mainly comprises a valve housing having an inlet and an outlet, a first valve seat between the inlet and the outlet and a socket axially aligned with the valve seat and projecting from the remainder of the housing. A tubular valve member having one end adjacent the valve seat is movable in the socket between a closed position, in which this one end engages the valve seat so as to prevent communication between the inlet and the outlet and an open position. The tubular valve member has between its ends a second valve seat and a second valve member is arranged in the tubular valve member between the one end thereof and the second valve seat and movable between a first position engaging the second valve seat and a second position spaced therefrom to permit flow of fluid from the interior of the valve housing through the tubular valve member to the outside of the valve housing. Biasing means normally bias the second valve member to its first or closed position, whereas displacing means are movable through the opposite end of the tubular valve member to an active position engaging with one end the second valve member to move the latter against the biasing means to the second position.

The socket is preferably formed with an inner screw thread and the tubular valve member with an outer screw thread engaged with said inner screw thread in the socket so that the tubular valve member may be moved between the positions thereof by turning it about its axis, whereby the tubular valve member may be held either in its open or the closed position as well as in any position therebetween so as to regulate flow of fluid between the inlet and the outlet.

The displacing means is preferably constituted by a tubular member of nozzle provided with cutouts at the one end thereof and being formed with a radially outwardly extending flange on a portion thereof projecting outwardly from the socket. In this construction, the tubular member or nozzle may be held in its active position, that is in the position in which it holds the second valve member spaced from the second valve seat so that the interior of the valve housing may be drained, by a screw cap threadingly engaged with the inner screw thread of the socket and engaging the flange on the tubular member.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is an axial cross-section through the combined shut-off and drain valve according to the present invention and showing the shut-off valve in open and the drain valve in closed position; and FIG. 2 is an axial cross-section similar to FIG. 1 and showing the shut-off valve in closed position and the drain valve moved by displacing means to an open position.

DESCRIPTION OF THE PREFERRED EMBODIMENT

Referring now to the drawing, and more specifically to FIG. 1 of the same, it will be seen that the combined shut-off and drain valve mainly comprises a one-piece valve housing 1 having an inlet end 2 and an outlet end 3 preferably aligned along a common axis with the inlet end. The housing 1 is further provided between the aforementioned ends with a transverse wall 1' provided with an opening therethrough forming an annular valve seat 1'' located preferably in a plane substantially parallel to the afore mentioned axis. The valve housing includes further a socket 4 integral with the remainder of the housing and axially aligned with the valve seat 1''. The socket 4 preferably has at the outer end portion thereof an inner diameter which is greater than the diameter of the portion of the pocket integral with the remainder of the housing, and both of these socket portions are provided with an inner screw thread. A tubular valve member 5 is located in the interior of the socket 4 and the tubular valve member 5 is provided at a portion intermediate its ends with an outer screw thread threadingly engaged with the screw thread provided at the smaller inner diameter portion of the socket. The outer surfaces of the portions of the tubular valve member 5 to opposite sides of the threaded portion thereof are smooth and the end of the tubular valve member 5 facing the annular valve seat 1'' has preferably a conical or spherical configuration. The opposite end of the tubular valve member has preferably an outer surface of hexagonal configuration or is provided with other means for facilitating turning of the tubular valve member about its axis so that the tubular valve member may be moved between the open position as shown in FIG. 1 and the closed position as shown in FIG. 2 by turning the same about its axis.

The tubular valve member 5 has intermediate its ends a radially enlarged inner portion forming a second valve seat 5' and a part-spherical second valve member 6 is yieldably held by biasing means against the second valve seat 5'. The aforementioned biasing means are preferably constituted by a conically shaped coil compression spring 7 engaging with one end thereof a flat bottom face of the second valve member, whereas the other end of the spring 7 engages a snap ring 19 located in an annular groove formed adjacent the inner end of the tubular valve member 5. The second valve member 6 may be moved against the force of the spring 7 away from the second valve seat 5' by means inserted through the outer end of the tubular valve member 5 in a manner as will be described below.

The valve seat 1" in the housing 1 and the tubular valve member 5 cooperating therewith forms therefore the shut-off valve, whereas the second valve member 6 cooperating with the valve seat 5' in the tubular valve member 5 constitutes the drain valve of the combined shut-off and drain valve according to the present invention.

The displacing means for moving the second member 6 away from the second valve seat 5' may be constituted by a tubular member of nozzle 8 which is movable with a slide fit from the outer end of the tubular valve member 5 into the interior of the latter until it displaces the second valve member 6 from the position shown in FIG. 1 to the position shown in FIG. 2. The end of the tubular member 8 which engages the second valve member 6 is provided with at least one, or preferably a plurality, of cutouts 9 so that in the displaced position of the second valve member 6, as shown in FIG. 2 fluid may flow from the interior of the valve housing 1 past the displaced second valve member 6 through the cutouts 9 into the interior of the tube 8 and through the latter to the outside. The outer free end of the tubular member 8 is preferably formed with annular grooves of substantially triangular configuration for connecting a hose to the outer free end of the tubular member 8. The tubular member 8 is further formed between the ends thereof with a radially outwardly extending annular flange 10 engageable with a screw cap 11 so that when the outer screw thread on the screw cap 11 is threadingly engaged with the inner screw thread at the outer end of the socket 4, the tubular member 8 may be brought to its active position as shown in FIG. 2 and held therein.

As shown in FIG. 1 the outer free end of the tubular member 5 is formed with an inner radially enlarged portion 16 forming a sealing edge 16', as shown in FIG. 2 the tubular member 8 is formed with a conical portion 8' which sealingly engages the aforementioned sealing edge 16 in the active position of the tubular member 8.

To properly seal the outer surface of the tubular valve member 5 against the inner surface of the socket 4, a ring 12 is located in the larger diameter outer end portion of the socket 4 and this ring is provided with an outer screw thread threadingly engaged with the corresponding screw thread in this end portion of the socket. The ring 12 is provided at the inner surface thereof with a groove which is also open at the side of the ring which faces away from the free end of the socket, and a sealing ring 13 is located in the groove engaging the smooth outer surface portion of the tubular valve member 5, and a washer 14 is sandwiched between the aforementioned side of the ring and a shoulder formed between the radially enlarged inner portion of the socket and the remainder thereof.

In the position as shown in FIG. 1 in which the drain valve is closed, the outer end of the socket may be closed by a screw cap 15 which has a radially outwardly extending flange abutting against a sealing ring 18 located in an annular gooove 17 at the end face of the socket 4.

Evidently, the tubular valve member 5 may be brought to any position between the two end positions respectively shown in FIGS. 1 and 2 so that in any in between position the tubular valve member 5 will regulate flow of fluid between the inlet and the outlet end of the valve housing. The valve member 5 cooperating with the annular valve seat 1" forms therefore not only a shut-off valve but also a fluid flow regulating valve. The valve construction according to the present invention will therefore permit a great simplification in hot water heating installations as described above.

It will be understood that each of the elements described above, or two or more together, may also find a useful application in other types of combined shut-off and drain valves differing from the types described above.

While the invention has been illustrated and described as embodied in a combined shut-off and drain valve especially for installation between a radiator in a hot water heating installation and the return conduit of the radiator, it is not intended to be limited to the details shown, since various modifications and structural changes may be made without departing in any way from the spirit of the present invention.

Without further analyses, the foregoing will so fully reveal the gist of the present invention that others can be applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended

1. A combined shut-off and drain valve comprising a valve housing having an inlet and an outlet end, a first valve seat between said inlet and said outlet end, and a socket axially aligned with said valve seat and projecting from the remainder of said housing; a tubular valve member having one end adjacent said valve seat and an opposite end and being movable in said socket between a closed position in which said one end engages said valve seat so as to prevent communication between said inlet and said outlet and an open position, said tubular valve member being provided in its interior spaced from said one end with a second valve seat; a second valve member permanently arranged in said tubular valve member between said one end of the latter and said second valve seat and movable between a closing position engaging said second valve seat and an opening position spaced therefrom to permit flow of fluid from the interior of said valve housing through said tubular valve member to the outside thereof; biasing means arranged within said tubular valve member between said one end thereof and said second valve member for biasing the latter to said closing position; and displacing means movable through said opposite end of said tubular valve member to an active position engaging with one end thereof said second valve member for moving the latter within said tubular valve member against said biasing means away from said valve seat in said tubular valve member to said opening position.

2. A valve as defined in claim 1, and including sealing means between said tubular valve member and said socket.

3. A valve as defined in claim 1, wherein said socket is formed with an inner screw thread and said tubular valve member with an outer screw thread threadingly engaging said inner screw thread so that said tubular valve member may be moved between the positions thereof by turning said tubular valve member about its axis.

4. A valve as defined in claim 3, wherein said displacing means is constituted by a tubular member provided with at least one cutout at said one end thereof and projecting with an end portion opposite said one end beyond said socket, and including means for holding said tubular member in said active position in which said one end thereof holds said second member in said opening position.

5. A valve as defined in claim 4, and including a radially outwardly extending flange on said end portion of said tubular member, said holding means comprising a screw cap threadingly connected to said inner screw thread and engaging said flange.

6. A valve as defined in claim 5, wherein said tubular valve member has at said opposite end an inner radially enlarged portion forming a sealing edge, said tubular member having between said flange and said one end an outer conical portion engaging said sealing edge when said tubular member is held in said active position.

7. A valve as defined in claim 3, wherein said tubular valve member has distant from said one end an outer smooth surface portion free of screw threads, and including sealing means between said outer surface portion and said socket.

8. A valve as defined in claim 7, wherein said socket has a free end portion of a larger inner diameter than the remainder of said socket and being likewise provided with an inner screw thread and surrounding said smooth surface portion of said tubular valve member, and wherein said sealing means comprises a ring located in said end portion of said socket and formed with an outer screw thread threadingly engaged with said inner screw thread and provided with an annular groove facing said smooth surface portion, and a sealing ring located in said groove.

9. A valve as defined in claim 8, wherein said groove is also open at that side of said threaded ring which faces away from the free end of said socket and including a washer engaging said side of said threaded ring.

10. A valve as defined in claim 1, wherein said inlet and said outlet end of said housing are aligned along a common axis, said first valve seat being located in a plane substantially parallel to said common axis and said socket having an axis substantially normal to said plane.

* * * * *